US008555734B2

(12) United States Patent
Elms

(10) Patent No.: US 8,555,734 B2
(45) Date of Patent: Oct. 15, 2013

(54) STABILISING MEANS

(75) Inventor: Antony Richard Elms, Fremantle (AU)

(73) Assignee: Technology Investment Company Pty Ltd, Fremantle, Western Australia (AU)

(*) Notice: Subject to any disclaimer, the term of this patent is extended or adjusted under 35 U.S.C. 154(b) by 1173 days.

(21) Appl. No.: 12/064,253

(22) PCT Filed: Aug. 25, 2006

(86) PCT No.: PCT/AU2006/001214
§ 371 (c)(1),
(2), (4) Date: May 15, 2008

(87) PCT Pub. No.: WO2007/022575
PCT Pub. Date: Mar. 1, 2007

(65) Prior Publication Data
US 2008/0302194 A1 Dec. 11, 2008

(30) Foreign Application Priority Data
Aug. 22, 2005 (AU) .............................. 2005904539

(51) Int. Cl.
*G01C 19/06* (2006.01)
(52) U.S. Cl.
USPC ........................................ 74/5.37
(58) Field of Classification Search
USPC ................................ 74/5 R–5.95
See application file for complete search history.

(56) References Cited

U.S. PATENT DOCUMENTS

| 796,893 | A | * | 8/1905 | Brennan | 180/219 |
| 844,837 | A | * | 2/1907 | Vanzini | 33/320 |
| 1,048,817 | A | * | 12/1912 | Falcke | 74/5.7 |
| 1,050,153 | A | * | 1/1913 | Marmonier | 318/649 |
| 1,066,860 | A | * | 7/1913 | Sparmann | 244/79 |

(Continued)

FOREIGN PATENT DOCUMENTS

| AU | A 41332/78 | 6/1979 |
| AU | A1-67 911/81 | 2/1981 |

(Continued)

OTHER PUBLICATIONS

Japanese Office Action #1 of Mar. 29, 2011 for 2008-527266.

(Continued)

*Primary Examiner* — Troy Chambers
*Assistant Examiner* — Michael Gonzalez
(74) *Attorney, Agent, or Firm* — Gottlieb, Rackman & Reisman, P.C.

(57) ABSTRACT

A vehicle stabilizing means comprising a cradle (23) supported from a mounting (17) to lie to one side of the mounting, a rotor (19) supported from the cradle between a pair of spaced supports (25) to be rotatably supported by the supports, a drive coupled to the rotor enabling the rotor to rotate at a substantially constant angular velocity, the rotor being rotatable about a first axis, the supports located to the side of the cradle remote from the mounting, the cradle further comprises a base (31) which is rotatably supported from the mounting to be rotatable around a second axis which is perpendicular to the first axis of rotation of the rotor and which intersects the first axis of the rotor, the mounting intended in use to be fixed to the vehicle such that in operation the mean orientation of the first and second axes are substantially perpendicular to the direction of the axis of stabilization.

16 Claims, 8 Drawing Sheets

(56) References Cited

U.S. PATENT DOCUMENTS

| | | | | |
|---|---|---|---|---|
| 1,186,856 | A | * | 6/1916 | Sperry .................... 74/5.37 |
| 1,548,442 | A | * | 8/1925 | Chessin .................. 74/5.22 |
| 1,558,514 | A | * | 10/1925 | Sperry .................... 74/5.37 |
| 1,573,028 | A | * | 2/1926 | Bates ..................... 74/5.22 |
| 1,800,408 | A | | 4/1931 | Schein |
| 1,999,897 | A | * | 4/1935 | Fieux ................... 33/275 G |
| 2,299,117 | A | | 10/1942 | Von Manteuffel |
| 2,512,279 | A | * | 6/1950 | Jones et al. .............. 74/5.34 |
| 2,590,207 | A | | 3/1952 | Ramsay |
| 2,603,003 | A | * | 7/1952 | Braddon ............... 33/317 R |
| 2,734,280 | A | * | 2/1956 | Christoph .................. 33/327 |
| 2,811,047 | A | * | 10/1957 | Christoph .................... 74/96 |
| 2,845,800 | A | * | 8/1958 | Holmes, Jr .............. 74/5.34 |
| 2,970,382 | A | * | 2/1961 | Notomi ..................... 33/321 |
| 2,970,480 | A | * | 2/1961 | Zeigler et al. ........... 74/5.37 |
| 3,158,340 | A | * | 11/1964 | Sellers ...................... 244/79 |
| 3,279,263 | A | | 10/1966 | Bell |
| 3,280,644 | A | * | 10/1966 | Vold ........................ 74/5.34 |
| 3,373,832 | A | | 3/1968 | Summers |
| 3,442,243 | A | | 5/1969 | Tanner |
| 3,463,109 | A | | 8/1969 | Weiler |
| 3,576,134 | A | | 4/1971 | Fersht |
| 3,691,853 | A | * | 9/1972 | Curriston et al. ........ 74/5.34 |
| 3,924,415 | A | | 12/1975 | Goren et al. |
| 3,986,092 | A | | 10/1976 | Tijsma et al. |
| 3,987,640 | A | | 10/1976 | Goren |
| 4,556,009 | A | | 12/1985 | Kaye |
| 4,867,889 | A | * | 9/1989 | Jacobson ................. 508/106 |
| 5,109,719 | A | * | 5/1992 | Piokins, Jr. ............... 74/5.37 |
| 5,213,222 | A | * | 5/1993 | Becker ..................... 212/253 |
| 5,256,942 | A | * | 10/1993 | Wood ....................... 318/649 |
| 5,628,267 | A | | 5/1997 | Hoshio |
| 5,839,386 | A | | 11/1998 | Frieling et al. |
| 6,176,193 | B1 | * | 1/2001 | Whitby et al. ....... 114/230.12 |
| 7,198,251 | B2 | * | 4/2007 | Kondoh .................... 251/193 |
| 2005/0076726 | A1 | * | 4/2005 | Akers ........................ 74/5.47 |

FOREIGN PATENT DOCUMENTS

| | | |
|---|---|---|
| AU | 8659-116 | 12/1986 |
| AU | B-54266/94 | 6/1994 |
| DE | 444096 | 5/1927 |
| DE | 108494 | 9/1974 |
| DE | 2620540 | 9/1987 |
| DE | 19640277 | 3/1997 |
| DE | 19748628 | 5/1999 |
| EP | 115856 | 8/1984 |
| EP | 526774 | 2/1993 |
| EP | 0650890 | 5/1995 |
| FR | 017136 | 11/1979 |
| GB | 582 | 0/1915 |
| GB | 158946 | 2/1921 |
| GB | 222996 | 10/1924 |
| GB | 243316 | 8/1926 |
| GB | 315996 | 7/1929 |
| GB | 373832 | 6/1932 |
| GB | 395689 | 7/1933 |
| GB | 2299117 | 10/1942 |
| GB | 549893 | 12/1942 |
| GB | 581776 | 10/1946 |
| GB | 791556 | 3/1958 |
| GB | 936627 | 9/1963 |
| GB | 980529 | 1/1965 |
| GB | 1035065 | 7/1966 |
| GB | 1315 119 | 4/1973 |
| GB | 047156 | 5/1979 |
| GB | 222 991 | 10/1994 |
| JP | 59053294 | 4/1984 |
| JP | 08-034400 | 2/1996 |
| JP | 8216989 | 8/1996 |
| JP | 08-282584 | 10/1996 |
| JP | 08-297027 | 11/1996 |
| JP | 10246637 | 9/1998 |
| JP | 2003054491 | 2/2003 |
| SE | 466998 | 5/1992 |
| SU | 927617 | 5/1982 |
| WO | WO 8804-364 | 6/1988 |
| WO | WO 8804363 | 6/1988 |
| WO | WO 91/02155 | 2/1991 |
| WO | WO 9106466 | 5/1991 |
| WO | WO 9111359 | 8/1991 |
| WO | WO 9403359 | 2/1994 |
| WO | WO 94/11294 | 5/1994 |
| WO | WO 94/14647 | 7/1994 |
| WO | WO 95/18742 | 7/1995 |
| WO | WO 96/33910 | 10/1996 |
| WO | WO 96/38081 | 9/1998 |
| WO | WO 9901340 | 1/1999 |
| WO | WO 00/15497 | 3/2000 |

OTHER PUBLICATIONS

Japanese Office Action #2 of Feb. 21, 2012 for 2008-527266.
2nd Chinese Office Action (Mar. 24, 2010).
European Search Report of Nov. 29, 2012.
1st Chinese Office Action (Jul. 10, 2009).

* cited by examiner

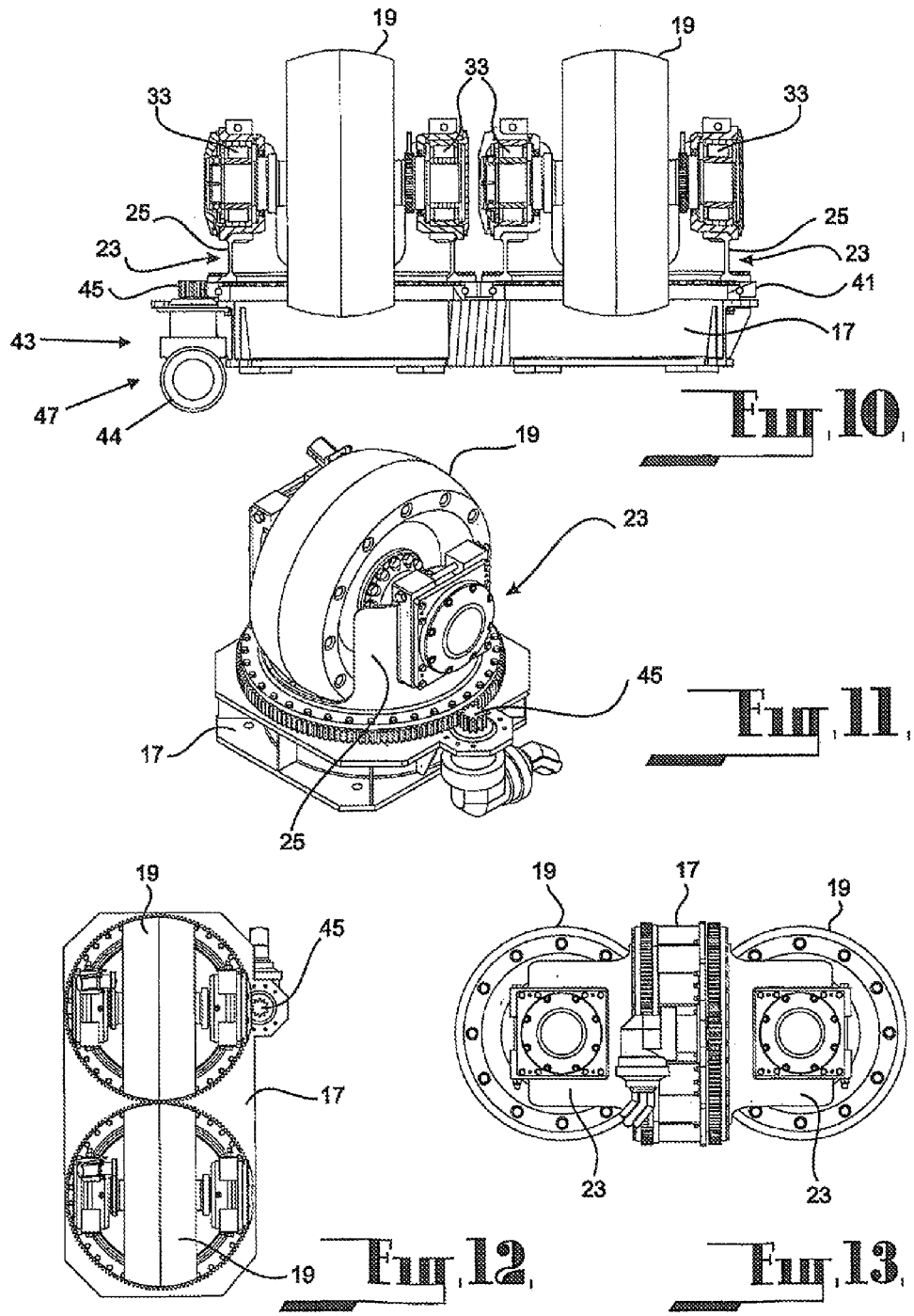

STABILISING MEANS

FIELD OF THE INVENTION

This invention relates to a stabilising means which can be utilised with mobile platforms such as vehicles and throughout the specification the term "vehicle" shall be taken to comprise any form of waterborne, land borne or airborne vehicle capable of moving through the relevant medium and furthermore shall be taken to include platforms which are substantially stationary and are essentially suspended such as those floating on water, those that are airborne and even those in outer space where it is desired to maintain the platform substantially stationary. An example of a stationary platform is a floating drilling platform which is maintained in station over a drilling site.

A particular application of the invention relates to a stabilising means which can be utilised with waterborne vessels. The stabilising means according to the invention utilises a gyroscopic system. Gyroscopic stabilising systems have been proposed in the past but because of their mass and the space required to accommodate them they have generally been limited to use with large vessels. However, more recently, the availability of rolling element bearings and closed loop control devices have also reduced cost and possibly size. The orientation adopted limits the axial bearing load that would otherwise be required to support the rotor weight. It is the axial load that limits the speed of the rotor and hence the weight of rotor required. Examples of arrangements which have been proposed in the past are disclosed in GB 243316, U.S. Pat. No. 5,628,267, GB 581776, GB 1315119.

Some arrangements which have been proposed in the past have provided that the gyroscopic arrangement actively cooperates with a set of foils and/or the rudder in order to control movement of the vessel while other arrangements comprise passive arrangements to control the rolling of the vehicle.

SUMMARY OF THE INVENTION

Throughout the specification the term "axis of stabilisation" shall be taken to include the axis about which the precession forces created by the movement of the rotor are not to be active. In the case of a vehicle which is expected to undergo movement in a direction the "stabilisation axis" is the direction of motion.

Accordingly to one aspect the invention resides in a vehicle stabilising means comprising a pair of cradles, supported from a mounting such that the cradles are in a generally side by side relationship with respect to each other, each cradle supporting a rotor by a pair of spaced supports, the rotor rotatably supported by the supports to rotate about a first axis, a drive supported from the cradle and coupled to the respective rotor enabling the rotor to rotate about the respective first axis at a substantially constant angular velocity, the rotation of the rotors being in opposite directions, each cradle rotatably supported from the mounting through a single bearing to be rotatable around a second axis which is perpendicular to the first axis of rotation of the rotor, the mounting intended in use to be fixed to the vehicle such that when the rotors are rotating the mean orientation of the first and second axes are substantially perpendicular to the direction of the axis of stabilisation.

According to a preferred feature of the invention the cradles are supported in a side by side relationship with respect to each other and the control means comprises a control drive interconnecting the cradles.

According to a preferred feature of the invention in use the cradles are located in or on the vehicle and are positioned to lie transversely side by side within the vehicle. The first axes are substantially co-linear.

According to a preferred feature of the invention in use the cradles are located in or on the vehicle and are positioned longitudinally side by side within the vehicle with respect to the fore and aft axis of the vehicle. According to a preferred feature of the invention the first axes are substantially parallel.

According to a preferred feature of the invention in use the cradles are located in a side by side relationship along a mounting axis located any position between the fore and aft axis of the vehicle and transverse to the fore and aft axis.

According to a preferred feature of the invention the cradles are supported from the mounting in opposed relation to each other to extend from the mounting to opposite sides of the mounting.

According to a preferred feature of the invention said cradles are linked by a control means adapted to cause equal and opposite precession of the cradles with respect to each other on a precession moment being applied to one or both of the rotors.

According to a preferred feature of the invention the control means comprises a gearing interconnection between the cradles. According to a preferred feature of the invention the gearing connection comprises a gear element on each cradle which is at least partially circular, said gear elements being meshingly interconnected. According to a preferred feature of the invention at least one cradle is associated with a second drive means adapted to overcome inertial and/or frictional forces applied to the cradle on a precession moment being applied to the cradle by the rotor. According to a preferred feature of the invention the second drive means comprises at a gear meshingly engaged with the gear element of at least one cradle and driven from a second drive, said second drive being controlled from a controller adapted to sense the induction and variation of the precession moment applied by the rotor to the cradle and to cause the second drive to cause corresponding movement of the cradle to overcome the inertia thereof. According to a one embodiment the gear comprises a pinion gear. According to another embodiment the gear comprises a worm gear. According to a further embodiment the gear comprises a helical gear.

According to a preferred feature of the invention wherein the second drive is adapted to be able to a apply a damping force to the cradle as result of activation from the controller.

According to a preferred feature of the invention the control means comprises a pulley cord extending around and between each cradle. According to a preferred feature of the invention the cord can be selected from any one or combination of a pulley belt, chain cable or like flexible elongate element. According to a preferred feature of the invention at least one cradle is associated with a second drive means adapted to overcome inertial and/or frictional forces applied to the cradle on a precession moment being applied to the cradle by the rotor.

According to a preferred feature of the invention the control means comprises a fluid drive interconnecting each cradle. According to a preferred feature of the invention at least one cradle is associated with a second drive means adapted to overcome inertial and/or frictional forces applied to the cradle on a precession moment being applied to the cradle by the rotor.

According to a preferred feature of the invention at least one cradle is associated with a braking means adapted to provide a braking torque to the cradles on rotation of the cradles beyond a predetermined position displaced angularly from the mean position of the cradle. According to a preferred feature of the invention the braking means comprises the second drive means. According to a preferred feature of the invention the braking means is adapted to provide a braking torque to the cradle on the acceleration or deceleration of rotation of the cradle, as a result of the precession moment being applied to the cradle, exceeding a desired limit. According to a preferred feature of the invention the braking means comprises one or more linear actuators connected to one or more cradles.

According to a preferred feature of the invention each bearing compromises a substantially co-planar stewing bearing capable of supporting radial, axial and tilting loads from a single bearing assembly lying substantially in a single plane.

According to a preferred feature of the invention the cradle is associated with an drive means adapted to overcome inertial and/or frictional forces applied to the cradle on a precession moment being applied to the cradle by the rotor.

According to another aspect the invention resides in a vehicle stabilising means comprising a cradle supported from mounting, a rotor supported from the cradle by a pair of spaced supports to be rotatably supported by the supports for rotation about a first axis, a drive coupled to the rotor enabling the rotor to rotate about the first axis at a substantially constant angular velocity, the cradle rotatably supported from the mounting through a single bearing assembly to be rotatable around a second axis which is perpendicular to the first axis of rotation of the rotor, the mounting intended in use to be fixed to the vehicle such that when the rotor is rotating the mean orientation of the first and second axes are substantially perpendicular to the direction of the axis of stabilisation.

According to a preferred feature of the invention the bearing comprises a substantially co-planar slewing bearing capable of supporting radial, axial and tilting loads from a single bearing assembly lying substantially in a single plane.

According to a preferred feature of the invention in use the second axes substantially comprises an upright axis of the vehicle.

According to another aspect the invention resides in a vehicle having a vehicle stabilising means of the form as described above.

According to a preferred feature of the invention the vehicle comprises a waterborne vessel.

According to a preferred feature of the invention the one side of the mounting is uppermost.

According to a preferred feature of the invention one side of the mounting is lowermost.

According to a preferred feature of the invention wherein the one side of the mounting is generally upright.

According to a preferred feature of the invention wherein the one side of the mounting is inclined.

According to a preferred feature of the invention the second drive means comprises at a gear engaged with a further gear element provide on at least one cradle and driven from a second drive, said second drive being controlled from a controller adapted to sense the induction and variation of the precession moment applied by the rotor to the cradle and to cause the second drive to cause corresponding movement of the cradle to overcome the inertia thereof.

According to a preferred feature of the invention wherein a vehicle stabilising means as claimed at any one of the claims 1 to 33 wherein the bearing is located to one side of the first axis.

According to a preferred feature of the invention wherein a vehicle stabilising means as claimed at any one of the claims 1 to 33 and 40 wherein the bearing comprises a composite bearing.

The invention will be more fully understood in the light of the following description of several specific embodiments.

BRIEF DESCRIPTION OF THE DRAWINGS

The description is made with reference to the accompanying drawings of which;

FIG. 10 is a sectional side elevation of the second embodiment along the line 5-5 of FIG. 9.

FIG. 11 is an isometric view of a third embodiment of the invention;

FIG. 12 is a schematic plan view of a fourth embodiment of the invention; and

FIG. 13 is a plan view of a fifth embodiment of the invention.

DETAILED DESCRIPTION OF A SPECIFIC EMBODIMENTS

The embodiments each relate to a stabilising means which is intended for use is association with a motor yacht, commercial transport vessel or military vessel. In the past the application of a stabilising means utilising a gyroscopic system has been impractical in motor yachts because of the mass of the system and the volume occupied by such systems and the difficulty of servicing the rotors of such systems. In motor yachts, a large proportion of their operating time is spent stationary or moving at low speeds and under these conditions the rolling action which can be applied to the vessel by sea conditions can be very undesirable. Therefore it is desirable to minimise the amount of rolling action applied to a vessel.

Figure 1:
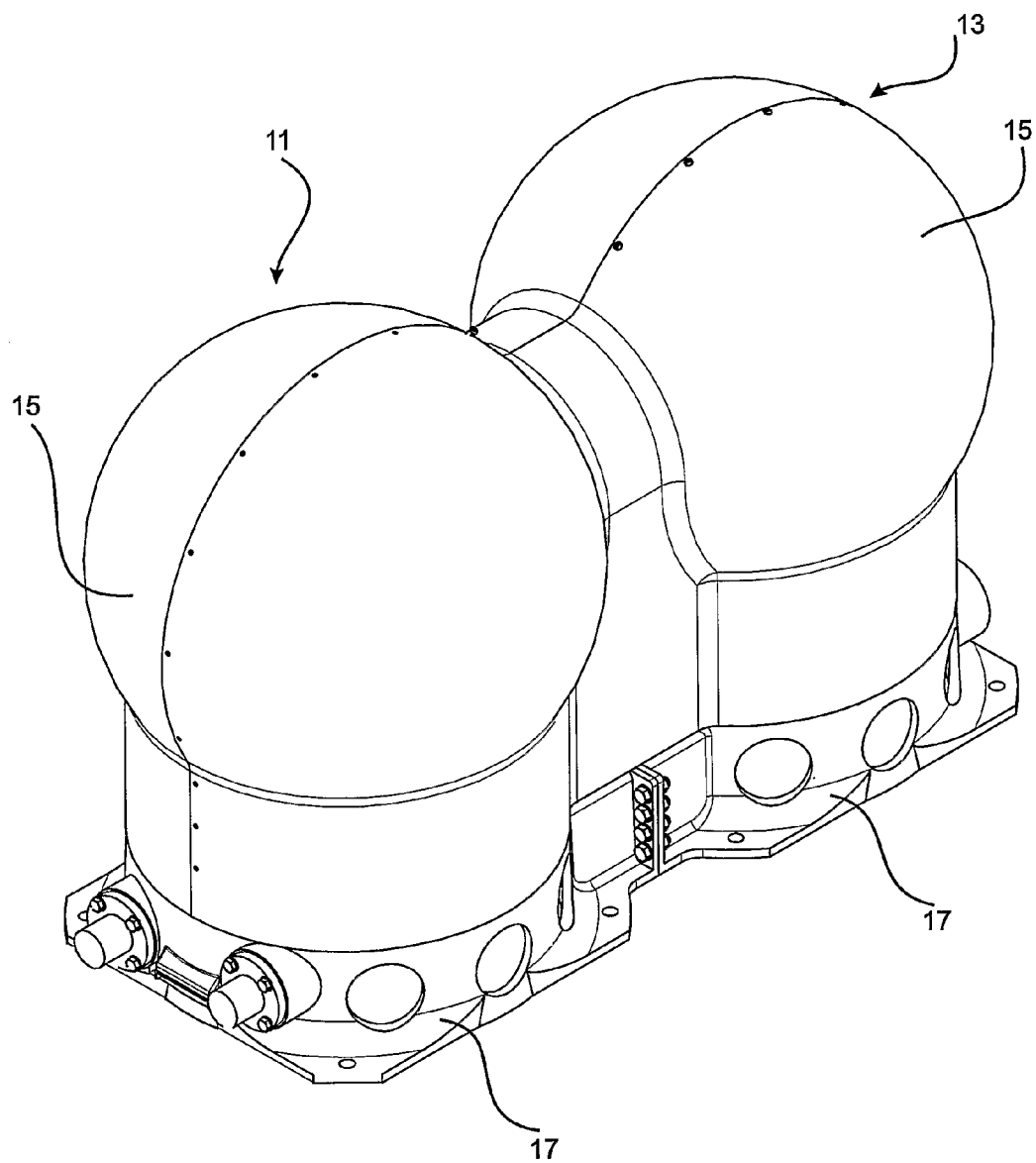
FIG. 1 is an isometric view of stabilising means according to the first embodiment.
Figure 2:
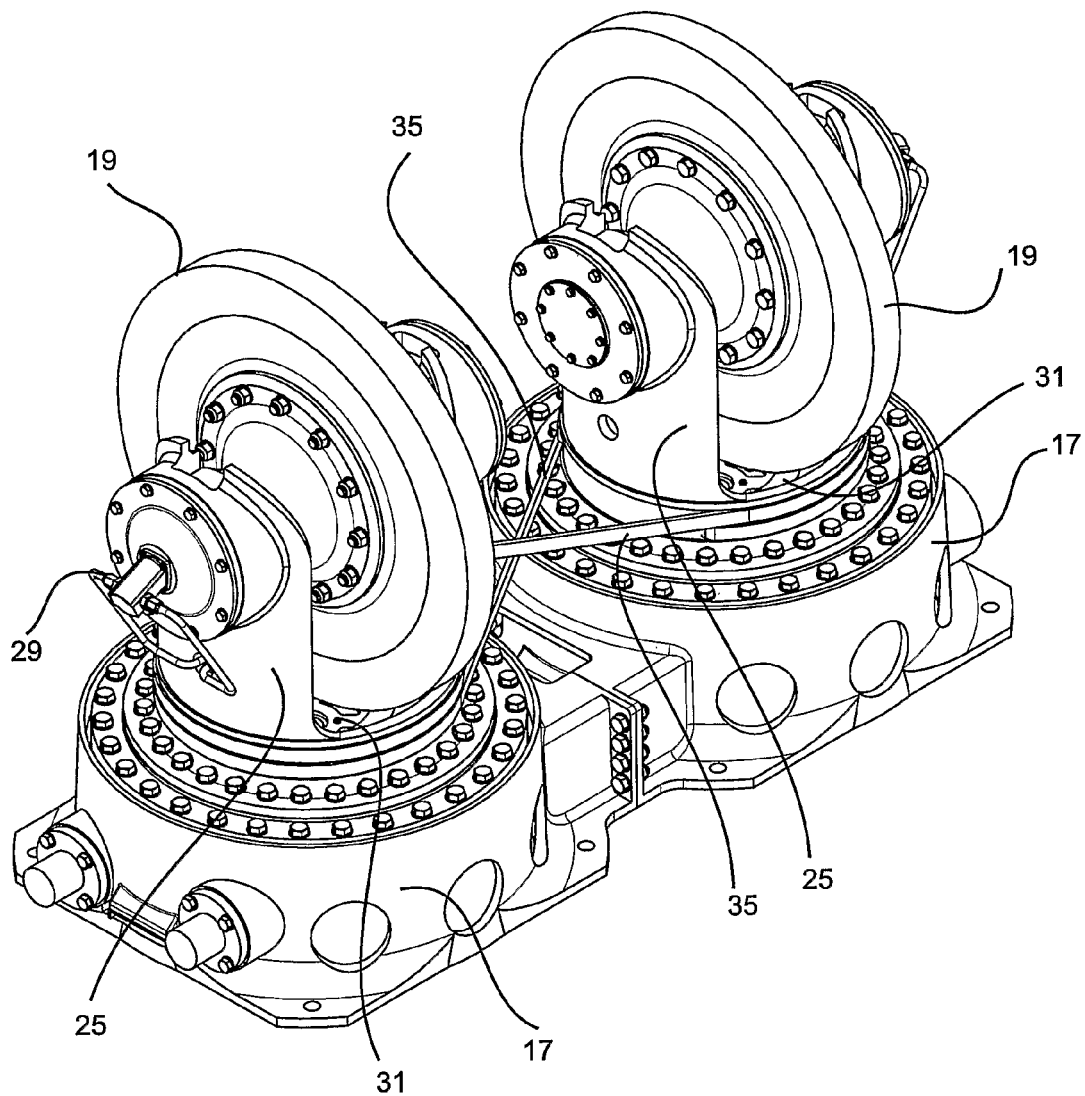
FIG. 2 is an isometric view of the stabilising means according to the first embodiment with the rotor covers removed.
Figure 3:
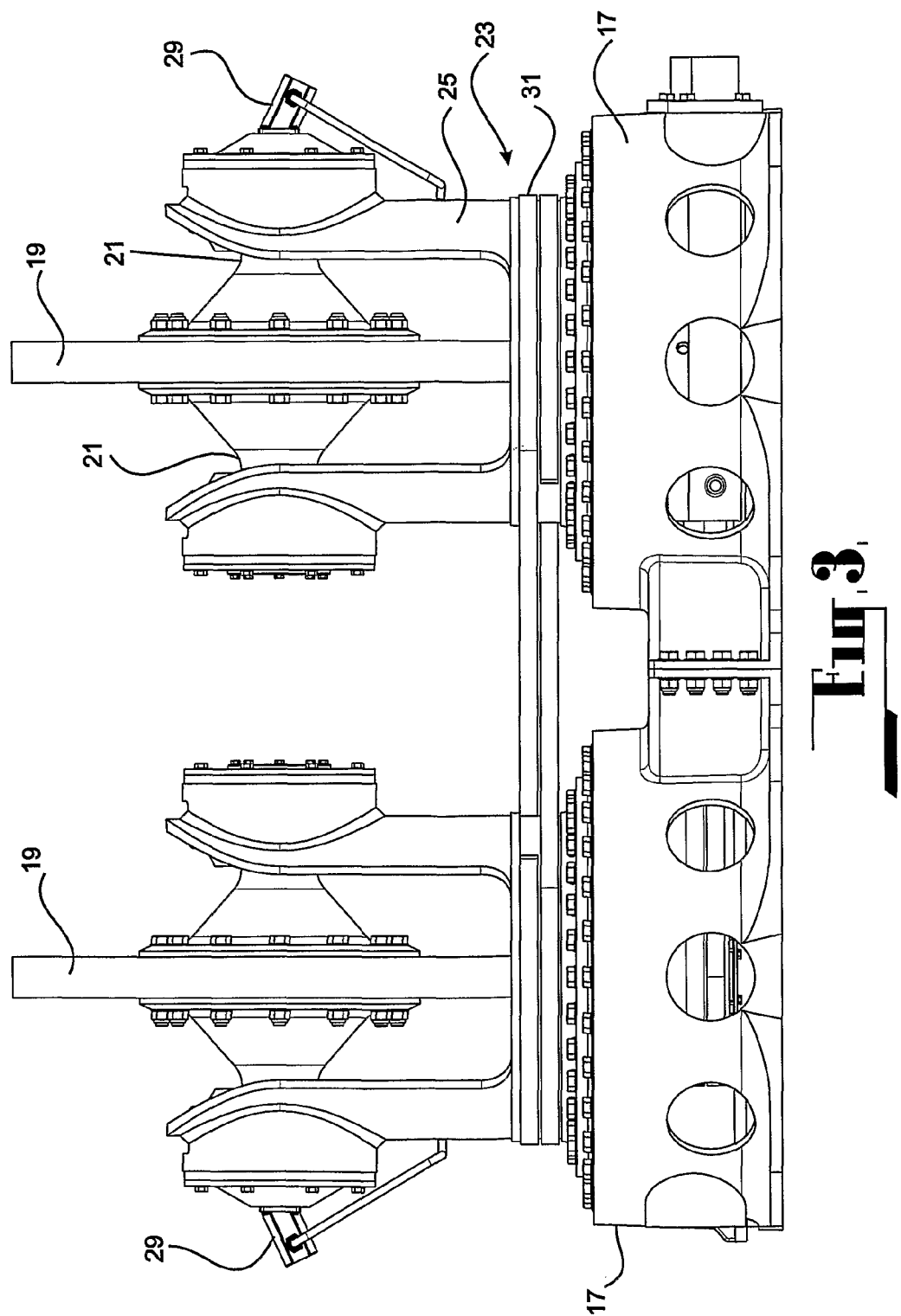
FIG. 3 is a side elevation of a stabilising means according to the first embodiment.
Figure 4:
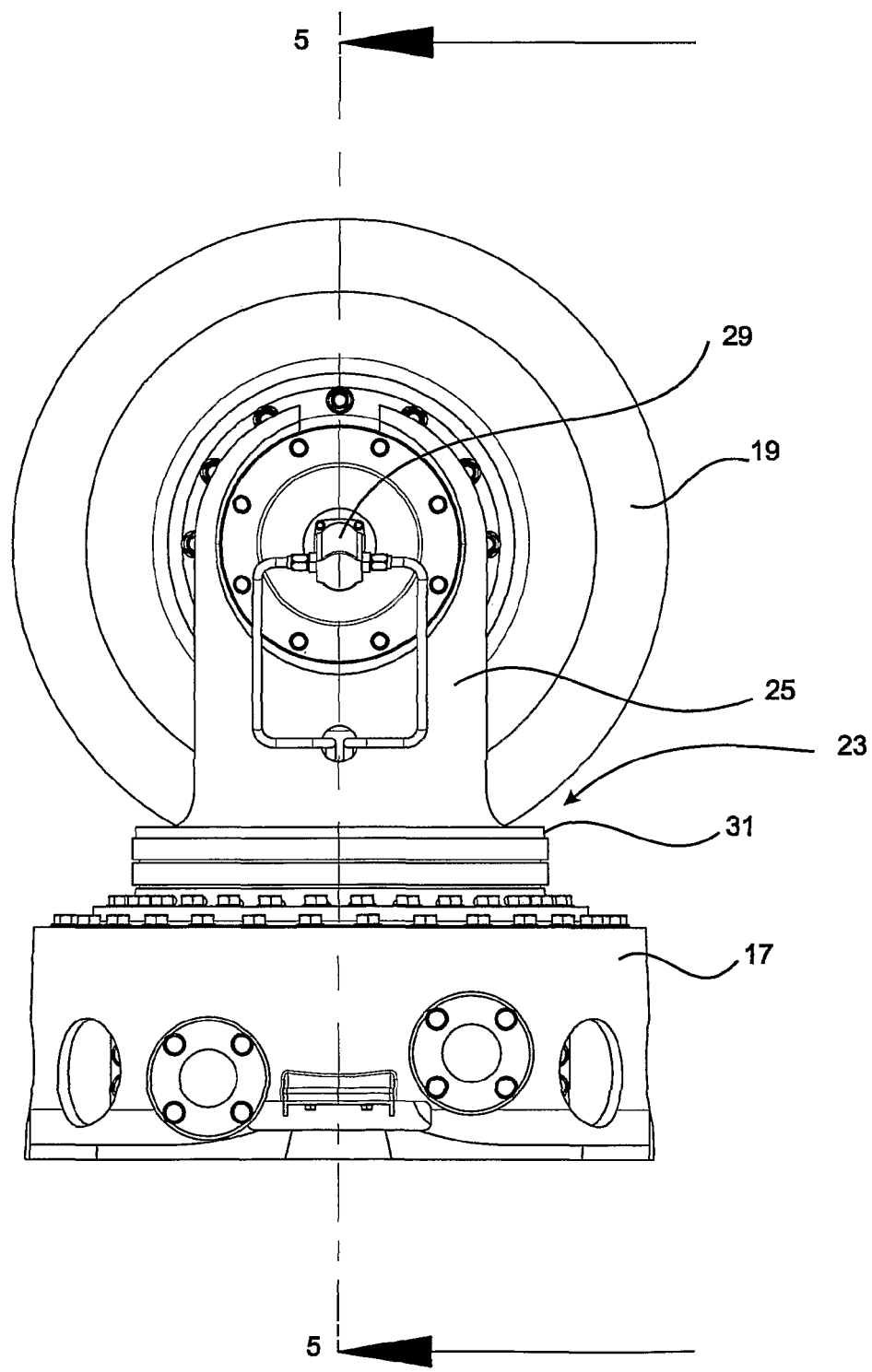
FIG. 4 is an end elevation of a stabilising means according to the first embodiment.
Figure 5:
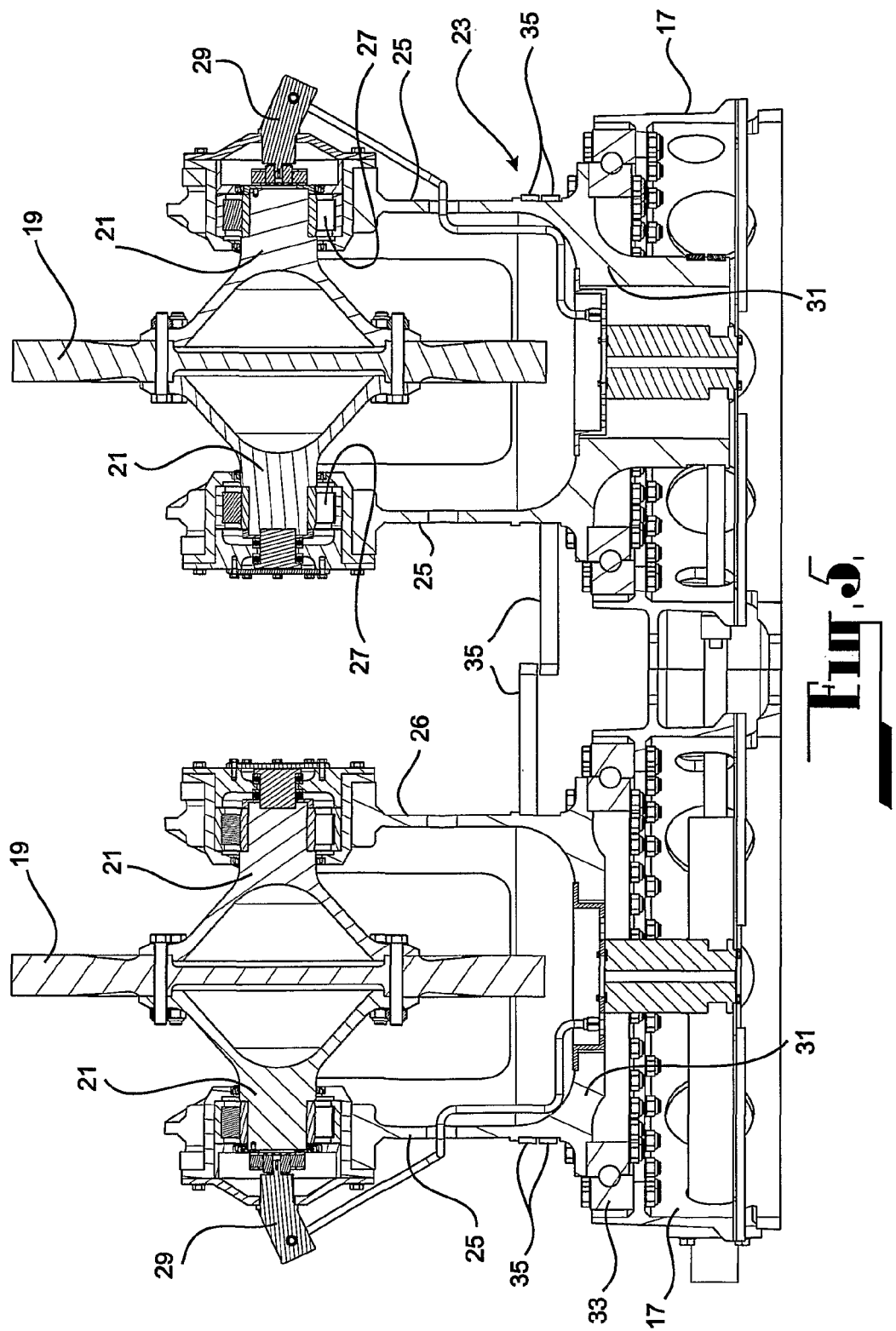
FIG. 5 is a sectional side elevation of the first embodiment along the line 5-5 of FIG. 4.

The first embodiment as shown at FIGS. 1 to 5 comprises a stabilising means which is intended for installation in a motor yacht, commercial transport vessel or military vessel where the stabilisation axis is parallel to the fore and aft axis of the vessel. The stabilising means comprises a pair of housings 11 and 13 and each housing is provided with a rotor cover 15 supported from a base 17. Each rotor covers encloses a rotor 19 having a pair of trunnions which are rotatably supported from a cradle 23. The cradle 23 comprises a pair of upstanding supports 25 supported from a base 31. The supports 25 are positioned in spaced relation across the base 31 of the cradle and are located to each side of the rotor 19. The upper end of each upstanding support is provided with a journal 27 which accommodates appropriate bearings which receive the trunnions 21 of the rotor to enable free rotation of the rotors on the upstanding supports 25 about first axes which are central to each rotor. Each rotor is associated with a hydraulic motor 29 supported from the upstanding supports 25 to cause the rotation of the rotors on the cradle 23. In the case of the first embodiment each base 31 is supported from a mounting 17 and the mountings are interconnected in a side by side relationship such that under operation the mean orientation of the first axes of rotation of the rotors are substantially co-linear. The drive which is provided by each of the motors 29 will cause rotation of each of the rotors about the first axes at substantially equal and constant angular speed however the rotation of the rotors are in opposite directions.

Each cradle is supported from the respective mounting 17 to be able to rotate on the mounting about a second axis of rotation which is perpendicular to the respective first axis of the rotor and intersects the first axis of the respective rotor 19. The rotational support for each base on the mounting is provided by a stewing bearing 33. The mountings 17 are fixed in a side-by-side relationship such that the first axes of rotation of the rotor 19 are collinear and the embodiment is positioned within the vessel such that the first axes are abeam of the hull of the vessel.

Each of the cradles 23 are interconnected by a pair of pulleys belts 35 which each pass around both cradles but which also belts crossover between the cradles. As a result of the arrangement of the pulleys rotation of one cradle will cause the opposite and equal rotation of the other cradle.

In addition each cradle is associated with a second drive (not shown) which is associated with a sensor and an associated controller which is able to detect when the cradle may be subjected to a processional torque applied to the cradle by the respective rotor 19 and provide an indication of the magnitude of the torque. The sensor may itself incorporate a gyroscope. The operation of the second drive is to overcome the inertial and/or friction forces which are applied to the cradle on application of a precessional torque from the respective rotor 19 and in order that the movement of the cradle is immediately responsive to the application of any such precessional torque, and to overcome the momentum contained in the cradle when the influence of the precessional forces has dissipated.

In addition each cradle is associated with a braking means (not shown) which is adapted to apply a braking torque to the cradle on the precessional rotation of the cradle causing movement beyond a predetermined position angularly spaced from the neutral position of the cradle, and/or is caused to move at a rate which is greater than desired.

Figure 6:
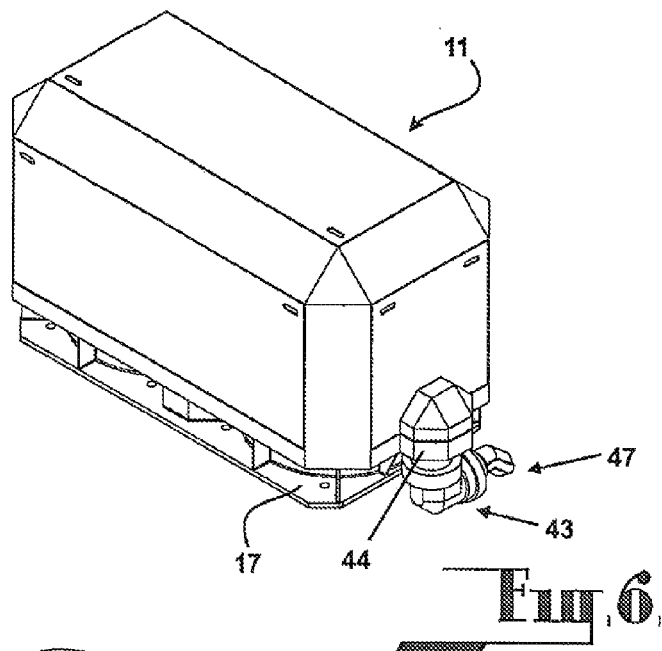
FIG. 6 is an isometric view of stabilising means according to the second embodiment.
Figure 7:
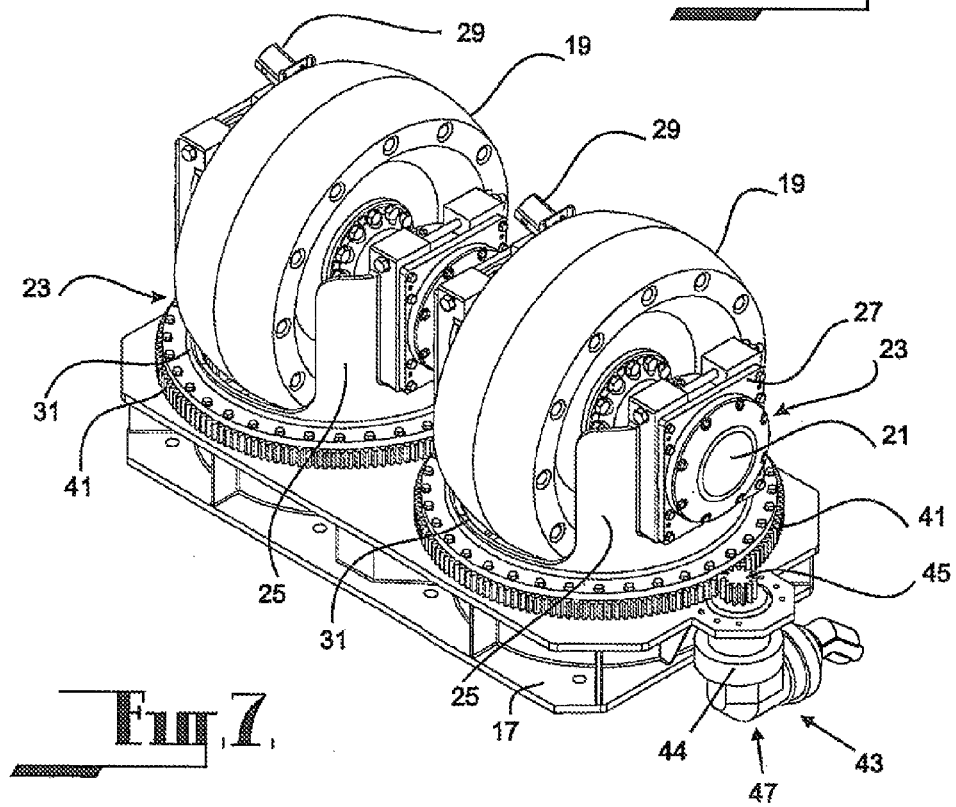
FIG. 7 is an isometric view of the stabilising means according to the second embodiment with the rotor covers removed.
Figure 8:
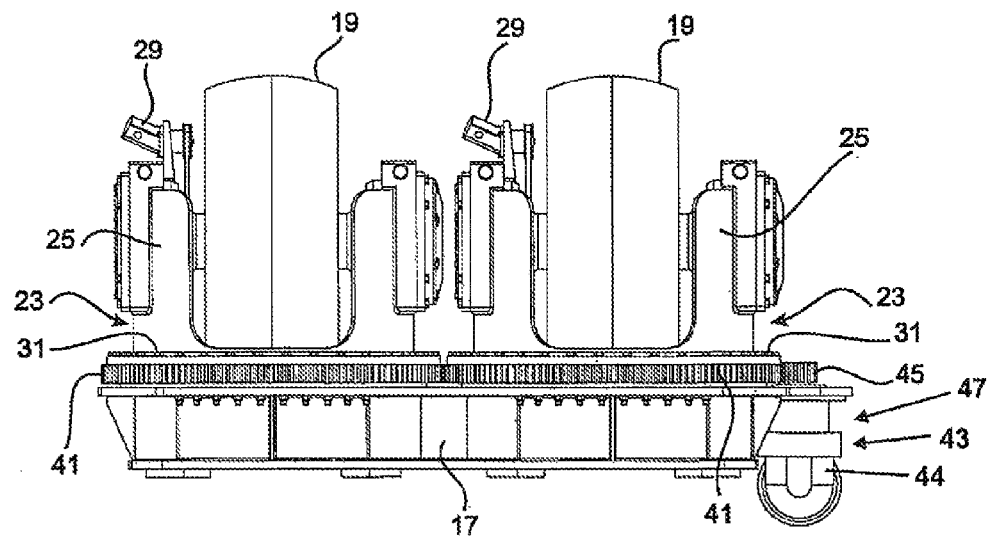
FIG. 8 is a side elevation of a stabilising means according to the second embodiment.
Figure 9:
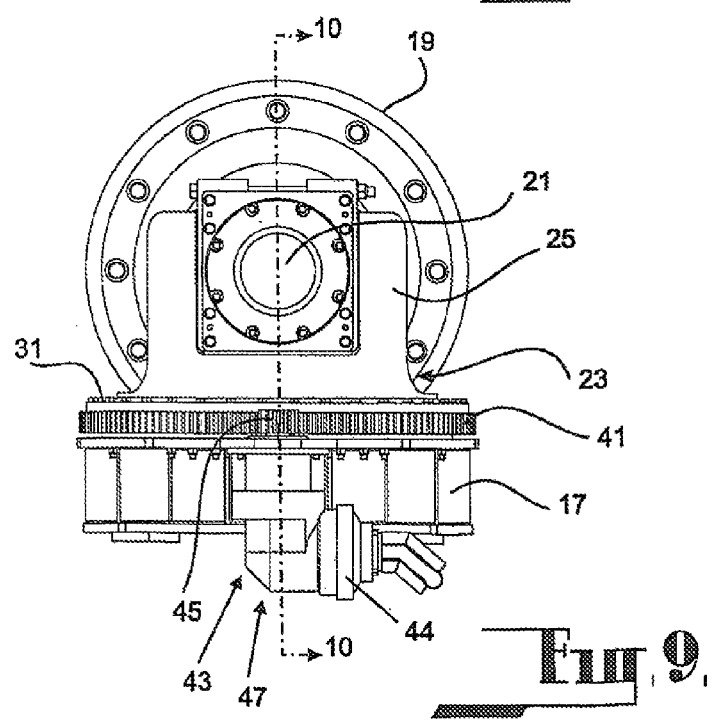
FIG. 9 is an end elevation of a stabilising means according to the second embodiment.

The second embodiment as shown at FIGS. 6 to 10 (the same reference numerals are used as those used in relation to the first embodiment for corresponding components) comprises a stabilising means which is intended for installation in a motor yacht, commercial transport vessel or military vessel where the stabilisation axis is parallel to the fore and aft axis of the vessel. The stabilising means comprises a housing 11 which covers encloses a pair of rotors 19 each having a pair of trunnions which are rotatably supported from their own cradle 23. The cradles 23 each comprises a pair of upstanding supports 25 supported from a base 31. The supports 25 are positioned in spaced relation across the base 31 of the cradle and are located to each side of the rotor 19. The upper end of each upstanding support is provided with a journal 27 which accommodates appropriate bearings which receive the trunnions 21 of the rotor to enable free rotation of the rotors on the upstanding supports 25 about first axes which are central to each rotor. Each rotor is associated with a hydraulic motor 29 supported from the upstanding supports 25 and connected to the respective rotor through a pulley drive to cause the rotation of the rotor on the cradle 23. In the case of the second embodiment each base 31 is supported from a common mounting 17 in a side by side relationship such that when operating the mean orientation of the first axes of rotation of the rotors are substantially co-linear. The drive which is provided by each of the motors 29 will cause rotation of each of the rotors about the first axes at substantially equal and constant angular speed however the rotation of the rotors are in opposite directions.

Each cradle is supported from the mounting to be able to rotate about a second axis of rotation which is perpendicular to the respective first axis of the rotor and intersects the first axis of the respective rotor 19. The rotational support for each base on the mounting is provided by a stewing bearing 33 between the respective base and the mounting. The cradles are fixed in a side-by-side relationship such that when operating the mean orientation of the first axes of rotation of the rotor 19 are collinear and the embodiment is located within the vessel such that the mean orientation of the first axes are abeam of the hull of the vessel.

The base of each of the cradles are provided with a ring gear 41 which is concentric with the second axis and the ring gears of the cradles 23 are meshingly interconnected. As a result of the meshing interengagement of the cradles through the ring gears the rotation of one cradle will cause the opposite and equal rotation of the other cradle.

In addition each cradle is associated with a second drive means 43. The second drive means 43 comprises a second drive 44 which is associated with a sensor and an associated controller which is able to detect when the cradle may be subjected to a processional torque applied to the cradle by the respective rotor 19 and provide an indication of the magnitude of the torque. The sensor may itself incorporate a gyroscope. The second drive is operatively connected to a spur gear 45 meshingly engaged with one of the ring gears whereby on activation of the second drive the spur gear is driven to cause rotation of the cradles. The operation of the second drive means 43 is to overcome the inertial and/or friction forces which are applied to the cradles on application of a precessional torque from the respective rotor 19 and in order that the movement of the cradle is immediately responsive to the application of any such precessional torque. In addition the second drive means 43 can serve as a braking means 47 to control the continued rotation of the cradles under the influence of the momentum induced into the cradle with precession of the rotors on the cessation of the application of the precessional forces to the cradle.

In addition each cradle is associated with a braking means (not shown) which is adapted to apply a braking torque to the cradle on the precessional rotation of the cradle causing movement beyond a predetermined position angularly spaced from the neutral position of the cradle, and/or is caused to move at a rate which is greater than desired. The braking means serves to supplement the braking that is applied by the spur gear 45.

The third embodiment as shown at FIG. 11 comprises a single rotor which corresponds to one rotor of the second embodiment and where vessel where the stabilisation axis is parallel to the fore and aft axis of the vessel. The mean orientation of the first axis of the rotor when operating is substantially perpendicular to the stabilisation axis.

In the case of the fourth embodiment as shown at FIG. 13 which is a variation of the second embodiment in that while the rotors 19 are located in a side by side relationship along a central fore and aft axis of the hull of the vessel the first axes of rotation of the rotors are parallel and directed abeam across the vessel. The stabilisation axis is parallel to the fore and aft axis of the vessel.

In the case of the fifth embodiment as shown at FIG. 12 which is a variation of the second embodiment in that while the rotors 19 are located in a side by side relationship they are mounted to a common mounting 17 such that the cradles are supported from opposite sides of the common mounting and such that the first axes of rotation of the rotors are parallel.

According to a sixth embodiment of the invention the second axes (being the axes of rotation of the cradle on the respective base) are directed abeam and the first axes of rotation being the axes of rotation of the rotors are upright with respect to the hull of the vessel.

According to an alternative embodiment of each of the above embodiments the rotors are driven by an electric motor.

It will be understood that the mounting of each of the embodiments can be positioned to be lowermost or uppermost or at any angular position therebetween around the stabilisation axis.

In each of the above embodiments described, when they are applied to a waterborne vessel, where the stabilisation axis comprise an axis which is parallel to the fore and aft axis of the vessel, the use of a pair of rotors which are rotating in opposite directions but at substantially equal angular speed ensures that in the event of the vessel being subjected to a rolling action about the fore-aft axis of the vessel the rolling action will be in part negated by the corresponding precession of the rotors. In addition in the event of the hull under-going a rotational movement about an upright axis (i.e. turning) the torque generated will be equal and opposite between rotors thus causing no affect on the vessel. In addition in the event of the hull undergoing a rotational movement about a horizontal axis that is perpendicular to the stabilisation axis the resultant precessional movement of the rotors will counteract each other to have no substantial effect on such rotation or stabilisation in the other axis.

The configuration of each of the embodiments provides a stabilisation means which differs from all of the known prior art in that it has a reduced profile since the support for the rotors is to one side of the axes of rotation of the rotors. Furthermore this arrangement provides for easier servicing of the rotors and replacement of the rotors and motors. As a result the stabilisers according to the embodiment can have application in smaller vessels than has been the case for prior art stabilisers.

Throughout the specification, unless the context requires otherwise, the word "comprise" or variations such as "comprises" or "comprising", will be understood to imply the inclusion of a stated integer or group of integers but not the exclusion of any other integer or group of integers.

It should be appreciated that the scope of the invention is not limited to the particular arrangement or application of the embodiments described above.

The claims defining the invention are as follows:

1. A gyroscopic vehicle stabilising means comprising a pair of rotors, a pair of cradles, each cradle supported from a mounting such that the cradles are in a generally side by side relationship with respect to each other, each cradle comprising a pair of spaced supports, each rotor only being rotatably supported by the supports of a respective one of the cradles, each rotor being rotatably supported such that the rotor is able to rotate about a first axis of rotation, a respective drive supported from each of the cradles and coupled to a respective one of the rotors so as to the enable each rotor to rotate about its respective first axis of rotation at a substantially constant angular velocity, the rotation of the rotors being in opposite directions, each cradle rotatably supported from the mounting through only a single bearing located to one side of the first axis of rotation of each rotor so that the cradle is rotatable around a second axis of rotation which is perpendicular to the first axis of rotation of the rotor, the mounting intended in use to be fixed to the vehicle such that when the rotors are rotating the mean orientation of the first and second axes are substantially perpendicular to the direction of the axis of stabilisation.

2. A gyroscopic vehicle stabilising means as claimed at claim 1, further comprising a control means comprising a control drive interconnecting the cradles.

3. A gyroscopic vehicle stabilising means as claimed at claim 1 wherein in use the cradles are positioned longitudinally side by side within the vehicle with respect to the fore and aft axis of the vehicle.

4. A gyroscopic vehicle stabilising means as claimed at claim 1 wherein in use the cradles are located in a side by side relationship along a mounting axis located at any position between the fore and aft axis of the vehicle and transverse to the fore and aft axis.

5. A gyroscopic vehicle stabilising means as claimed at claim 1 wherein each single bearing comprises a substantially co-planar slewing bearing capable of supporting radial, axial and tilting loads.

6. A gyroscopic vehicle stabilising means as claimed at claim 1 wherein the bearing is located to one side of the first axis.

7. A gyroscopic vehicle stabilising means as claimed at claim 1 wherein the bearing comprises a composite bearing.

8. A gyroscopic vehicle stabilising means as claimed at claim 1 wherein in use the cradles are positioned to lie transversely side by side within the vehicle.

9. A gyroscopic vehicle stabilising means as claimed at claim 8 wherein the mean orientation of the first axes are substantially co-linear.

10. A gyroscopic vehicle stabilising means as claimed at claim 1 wherein said cradles are linked by a control means adapted to cause equal and opposite precession of the cradles with respect to each other on a precession moment being applied to one or both of the rotors.

11. A gyroscopic vehicle stabilising means as claimed at claim 10 wherein the control means comprises a pulley cord extending around and between each cradle.

12. A gyroscopic vehicle stabilising means as claimed at claim 11 wherein the cord can be selected from any one or combination of a pulley belt, chain, cable, or like flexible elongate element.

13. A gyroscopic vehicle stabilising means as claimed at claim 11 wherein at least one cradle is associated with a second drive means adapted to overcome inertial and/or frictional forces applied to the cradle on a precession moment being applied to the cradle by the rotor.

14. A gyroscopic vehicle stabilising means as claimed at claim 10 wherein at least one cradle is associated with a braking means adapted to provide a braking torque to the cradles on rotation of the cradles beyond a predetermined position displaced angularly from the mean position of the cradle.

15. A gyroscopic vehicle stabilising means as claimed at claim 14 wherein the braking means comprises a second drive means.

16. A gyroscopic vehicle stabilising means as claimed at claim 14 wherein the braking means is adapted to provide a braking torque to the cradle on the acceleration or deceleration of rotation of the cradle, as a result of the precession moment being applied to the cradle, exceeding a desired limit.

\* \* \* \* \*